United States Patent
Liu et al.

(10) Patent No.: US 9,715,498 B2
(45) Date of Patent: Jul. 25, 2017

(54) DISTRIBUTED SERVER SYSTEM FOR LANGUAGE UNDERSTANDING

(71) Applicant: Microsoft Technology Licensing, LLC, Redmond, WA (US)

(72) Inventors: Xiaohu Liu, Bellevue, WA (US); Ruhi Sarikaya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/840,203

(22) Filed: Aug. 31, 2015

(65) Prior Publication Data
US 2017/0060848 A1   Mar. 2, 2017

(51) Int. Cl.
G06F 17/27   (2006.01)
G06F 17/28   (2006.01)
G10L 15/30   (2013.01)
G10L 15/22   (2006.01)

(52) U.S. Cl.
CPC ............ *G06F 17/28* (2013.01); *G06F 17/278* (2013.01); *G06F 17/2785* (2013.01); *G06F 17/274* (2013.01); *G10L 15/22* (2013.01); *G10L 15/30* (2013.01)

(58) Field of Classification Search
CPC .. G06F 17/2785; G06F 17/274; G06F 17/271; G06F 17/277; G06F 17/2755; G10L 15/22; G10L 15/30; G10L 15/265; G10L 15/02; G10L 15/063; G10L 15/065; G10L 15/08; G10L 15/197; G10L 15/183
USPC ... 704/9, 231, 243, 244, 245, 251, 255, 257, 704/270
See application file for complete search history.

(56) References Cited

U.S. PATENT DOCUMENTS

| | | | |
|---|---|---|---|
| 5,839,106 | A | 11/1998 | Bellegarda |
| 5,956,683 | A | 9/1999 | Jacobs et al. |
| 6,633,846 | B1 | 10/2003 | Bennett et al. |
| 6,738,743 | B2 | 5/2004 | Sharma et al. |
| 7,013,275 | B2 | 3/2006 | Arnold et al. |
| 7,472,060 | B1 | 12/2008 | Gorin et al. |
| 7,725,307 | B2 | 5/2010 | Bennett |
| 7,805,302 | B2 | 9/2010 | Chelba et al. |

(Continued)

OTHER PUBLICATIONS

Pearce, et al., "The Impact of Distributed Speech Recognition on multi-modal interfaces to the Mobile Web", In Proceedings of ETSI STQ Aurora DSR Subgroup DSR Applications & Protocols, Sep. 2000, 5 pages.

(Continued)

*Primary Examiner* — Vu B Hang

(57) ABSTRACT

Systems and methods for training and using a natural language understanding system are provided. More specifically, the systems and methods train a natural language understanding system utilizing a distributed network of feature extractors on features servers. Further, the systems and methods for using the natural language understanding system utilize a distributed network of features extractor on features servers. Accordingly, the systems and methods provide for a more accurate natural langue understanding system, a more reliable natural langue understanding system, and a more efficient natural langue understanding system. Further, the systems and methods provide for natural language understanding systems with better development (including update ability), productivity, and scalability.

18 Claims, 9 Drawing Sheets

(56) References Cited

U.S. PATENT DOCUMENTS

| | | | |
|---|---|---|---|
| 8,019,608 B2 | 9/2011 | Carraux et al. | |
| 8,898,065 B2 | 11/2014 | Newman et al. | |
| 2006/0122834 A1 | 6/2006 | Bennett | |
| 2008/0147402 A1* | 6/2008 | Jeon | G10L 15/142 704/251 |
| 2012/0130709 A1* | 5/2012 | Bocchieri | G10L 15/063 704/201 |
| 2014/0136183 A1 | 5/2014 | Hebert et al. | |
| 2015/0347851 A1* | 12/2015 | Saklatvala | G06K 9/00979 382/190 |

OTHER PUBLICATIONS

Mooney, et al., "Mining Knowledge from text using Information Extraction", In Proceedings of Explorations Newsletter—Natural language processing and text mining Homepage archive vol. 7, Issue 1, Jun. 2005, pp. 3-10.

Cozar, et al., "Review of Spoken Dialogue Systems", In Loquens, vol. 1, Issue 2, Dec. 30, 2014, 15 Pages.

"International Search Report and Written Opinion Issued in PCT Application No. PCT/US2016/049337", Mailed Date: Dec. 20, 2016, 12 Pages.

Sacaleanu, et al., "An Adaptive Framework for Named Entity Combination", In Proceedings of LREC 2012 Eighth International Conference on Language Resources and Evaluation, May 21, 2012, pp. 1244-1249.

Simard, et al., "ICE: Enabling Non-Experts to Build Models Interactively for Large-Scale Lopsided Problems", Retrieved from <<https://www.microsoft.com/en-us/research/wp-content/uploads/2014/09/1409.4814.pdf>>, Sep. 16, 2014, 10 Pages.

Williams, et al., "Rapidly Scaling Dialog Systems with Interactive Learning", In Proceedings of the International Workshop on Spoken Dialog Systems, Jan. 11, 2015, 12 Pages.

* cited by examiner

DISTRIBUTED SERVER SYSTEM FOR LANGUAGE UNDERSTANDING

BACKGROUND

Machine learning, language understanding, and artificial intelligence are changing the way users interact with the computers. Developers of computers and applications are always trying to improve the interactions between humans and computers. However, development of language understanding models often requires a significant amount of time, money, and other resources to accomplish.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for training and using a natural langue understanding system. More specifically, the systems and methods disclosed herein train and use a natural language understanding system utilizing a distributed network of feature extractors on one or more features servers. Accordingly, the systems and methods disclosed herein provide for a more accurate natural language understanding system, a more reliable natural language understanding system, and a more efficient natural language understanding system. Further, the systems and methods described herein provide natural language understanding systems with better development (including update ability), productivity, and scalability One aspect of the disclosure includes a language understanding system. The language understanding system comprises a language understanding server. The language understanding server includes a processor and memory. The processor executes instructions stored on the memory to perform a method. The method includes retrieving training features from a plurality of feature extractors and estimating model parameters based on a training algorithm that utilizes the training features from different feature servers to form a trained language understanding model. The plurality of feature extractors are each located on different feature servers. The language understanding server is separate from the different feature servers.

Another aspect of the disclosure is directed to a method for training and using a natural language understanding system. The method comprises training a language understanding model of a language understanding system. The training of the language understanding model comprises receiving, at a language understanding server, training features from a plurality of feature extractors and estimating model parameters based on a training algorithm that utilizes the training features from the different feature servers to form a trained language understanding model. The plurality of feature extractors are each located on different feature servers. The language understanding server is separate from the different feature servers.

Yet another aspect of the disclosure includes a system. The system comprises at least one processor and a memory. The memory includes computer-executable instructions stored thereon. The computer-executable instructions are executed by the at least one processor. The computer-executable instructions cause the system to perform operations, the operations comprising receiving a natural language input from a client device on a natural language server, sending the natural language input to a first feature extractor on a first server from the natural language server, sending the natural language input to a second feature extractor on a second server from the natural language server, and sending the natural language input to a third feature extractor on a third server from the natural language server. The first server, the second server, the third server, and the natural language server are different and separate from each other. The computer-executable instructions cause the system to perform further operations, the operations comprising receiving a first set of potential features for the natural language input from the first feature extractor by the natural language server, receiving a second set of potential features for the natural language input from the second feature extractor by the natural language server, and receiving a third set of potential features for the natural language input from the third feature extractor by the natural language server. The computer-executable instructions cause the system to perform additional operations, the operations comprising aggregating the first set of potential features, the second set of potential features, and the third set of potential features to form an aggregated set of potential features and evaluating the aggregated set of potential features utilizing a language understanding model trained with training features from the first feature extractor, the second feature extractor, and the third feature extractor. The computer-executable instructions cause the system to perform further operations, the operations comprising determining a user intent, a domain, and entities and associated confidence scores based on evaluating the aggregated set of potential features and generating a response based on the user intent, the domain, and the entities and the associated confidence scores.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples or aspects are described with reference to the following Figures.

DETAILED DESCRIPTION

Figure 1:
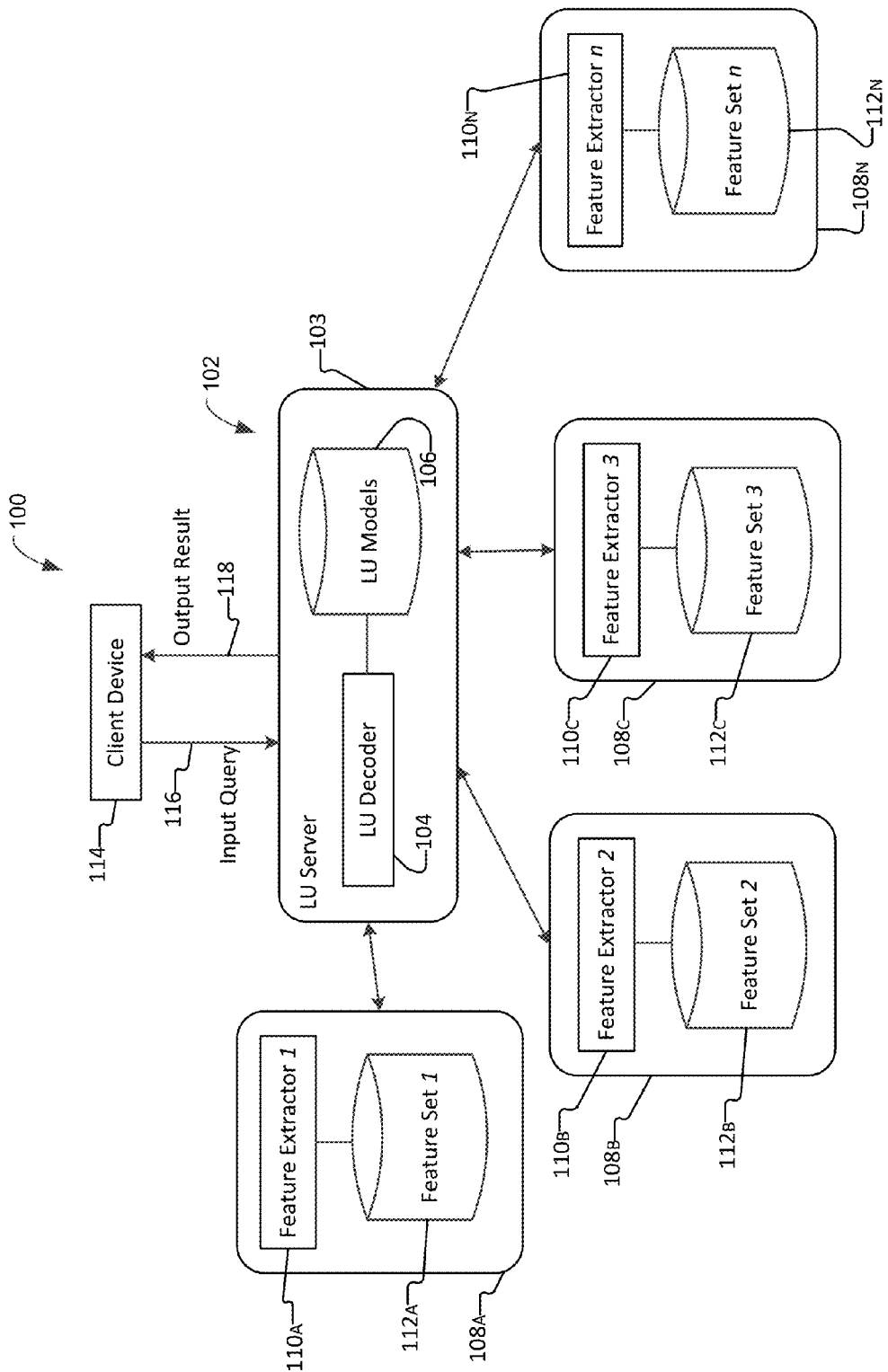
FIG. 1 is a schematic diagram illustrating an example of a distributed system including a client device, a natural language understanding system, and a plurality of distributed features extractors.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with computers. Digital assistant applications, such as Siri, Google Now and Cortana are examples of the shift in human computer interaction. A natural language understanding (NLU) system is responsible to extract semantic frames to represent the natural language input's domain, intents, and semantic slots (or entities). The NLU system utilizes NLU models that are usually trained from domain specific inputs (also referred to herein as queries) with semantic annotation. Various features, such as word N-gram, dictionaries, personalization, etc., from feature extractors are used to build NLU models. The same set of features from the features extractors utilized to the train the NLU model are also extracted at run time for semantic decoding of a received natural language input after the NLU has been trained.

Traditionally, NLU models and related resources (e.g., features extractors) for feature extraction reside on the same server of the NLU system. The feature extraction (e.g., featurization process) and query understanding (e.g., decoding process) are tightly coupled and therefore, this previously utilized configuration made sense. However, as NLU systems become more sophisticated and are able handle more data from more features extractors, this configuration becomes very limiting. For example, the NLU server has to have enough storage to host all features extractors, such as entity dictionaries. Further, the decoding process may be slowed down as larger amounts of memory are used to store features and their feature extractors. Additionally, as each domain and language requires additional memory and storage, it will be harder to scale to more languages and domains by the NLU system. Further, each features on the NLU system will have to be independently updated, which usually requires the entire server to be taken out of service.

For example, in a "places" domain, a business name dictionary may contain 12 million entries for a specific U.S. location alone. This single dictionary can take about 1 GB memory. If the NLU system wants to support 15 locales, the server for the NLU system will consume 15 GB memory just to support business name dictionaries since each locale will require localized dictionaries. With so much memory consumed by dictionaries, there is much less memory available to support more domains and locales. Moreover, the dictionary is changing every day, which requires the NLU server to be updated and taken offline on daily basis in order to keep up with the change.

There is typically no system or method that allows a NLU system to be trained and utilized by accessing a plurality of different feature extractors that may be saved on different servers. The systems and method disclosed herein provide for a distributed NLU system. Accordingly, the systems and methods as disclosed herein are able to train a NLU model and process a received natural language input utilizing inputs from a plurality of feature extractors on different and separate servers. The NLU system is divided into multiple services using service-oriented architecture. The different services (also referred to herein as feature extractors) may be located on a different servers and provide different functionalities such as feature extraction and/or semantic decoding. For example, a first service may provide business name feature extraction and a second service may provide location feature processing. As such, when new business names are added or removed, the business name service is updated and taken offline, while the NLU server and the server for the location feature processing remain untouched. As a result, services can be independently developed and hosted. Further, in some examples, the service or features extractor may be another NLU system. In these examples, the output from this auxiliary NLU system is utilized as inputs into the NLU system as disclosed herein. Accordingly, the systems and method disclosed herein improve the NLU system's development, productivity, and scalability.

Therefore, the systems and methods disclosed herein provide for a more accurate NLU system, a more reliable NLU system, and a more efficient NLU system. For example, the processing time for responding to a received natural language input may be decreased based on the increased memory (from the removal of the features extractors from the server) and based on the feature extractors being able to run in parallel. Further, the systems and methods described herein prevent having to take the NLU system offline to update the entity dictionaries utilized by the NLU system.

FIG. 1 illustrates an example of a distributed system 100 including a client device 114, a natural language understanding (NLU) system 102, and a plurality of distributed feature extractors 110. The NLU system 102 is designed to classify (also referred to as labeling or tagging herein) and decode a wide variety of different natural language inputs 116 from a client device 114 utilizing machine learning techniques. The inputs 116 may be any sequence of natural language data that needs to be clustered or classified and decoded, such as queries, search queries, commands, etc.

The NLU system 102 includes a language understanding (LU) decoder 104 and one or more LU models 106 on a language understanding (LU) server 103. The LU server 103 of the NLU system 102 does not include any feature extractors 110 or feature databases 112. In contrast, the NLU system 102 communicates with one or more feature extractors 110. Each feature extractor 110 is located on feature servers 108 that are separate and different from the feature server 108 of another feature extractor 110. The NLU system 102 communicates with the one or more feature extractors 110 during training and input processing.

Before the NLU system 102 can classify and decode a received input signal 116, the LU models 106 of the NLU system 102 is trained for a specific task based on the type of input signal 116 that the NLU system 102 received from the client device 114. The specific task may also be referred to as a "specific application" herein. In other words, the LU models 106 may be trained with the same type of data that the LU model is going to receive in response to a NL input 116.

The NLU system 102 sends a request for training input for the specific task to the one or more feature extractors 110 on the feature servers 108. The feature extractors 110 pull information from their feature databases 112 and generate training features based on the specific task. The training features may include items, such as client intent, a domain, and entities. Further, the training features may include confidence scores for each determined item. A confidence score is an indicator, such as a ranking or percentage, that signifies how accurate or how confident a features extractor is about the identified training item. Each feature extractor 110 sends the training features to the LU server 103 of the NLU system 102. The LU server 103 of the NLU system 102 receives the training features from each of the feature extractors 110. The training features in combination with a training algorithm are utilized to train LU models 106 to form a trained language understanding (LU) models 106. Any suitable training algorithm for training one or more LU models 106 as would be known by a person of skill in the art may be utilized to train the LU models 106. For example, the LU models 106 may estimate model parameters based on the training algorithm that utilizes the training features from the different feature servers 108 to form the trained LU models 106. In some examples, the training of the LU models 106 occurs when the NLU system 102 is not in communication with or is not connected to the client device 114 (referred to herein as "offline"). Additionally, the feature extractors 110 may process or generate the training features in parallel. In other words, each of the feature extractors may be processing received inputs, generating training features, and sending the generated training features simultaneously or at overlapping times to the LU server 103 of the NLU system 102. As such, the NLU system 102 supports multiple training features extraction at once.

Once the LU models 106 has been trained, the NLU system 102 may be utilized to process natural language inputs 116 from a client device 114. The decoding and classifying of natural language inputs 116 from the client device 114 occurs while the NLU system 102 is in communication with or connected to the client device 114 (referred to herein as "online"). While on-line, the LU server 103 of the NLU system 102 receives a NL input 116 from the client device 114. For example, the LU decoder 104 that is resident on the LU server 103 may receive the input 116. In some examples, the LU decoder 104 determines if the input 116 needs any preprocessing. If LU decoder 104 determines that preprocessing of the input 116 is necessary, the LU decoder 104 preprocesses the input 116, such as normalization or reformatting of the NL input 116. If LU decoder 104 determines that preprocessing of the input 116 is not necessary, the LU decoder 104 does not modify the natural language input 116. The LU server 103 of the NLU system 102 sends the entire input 116 to one or more feature extractors 110 located on feature servers 108 that are separate and distinct from each other and from the LU server 103.

The feature extractors 110 may use feature set definitions to extract potential features from the received NL input 116. In other words, each feature extractor 110 analyzes the NL input 116 utilizing their feature database 112, such as entity dictionaries, to determine potential features for the received input. In some examples, the potential features comprise different features, such as client intent, a domain, and entities. Further, potential features may include confidence scores for each determined item. A confidence score is an indicator, such as a ranking or percentage, that signifies how accurate or how confident a features extractor is about an identified item. In some examples, the NLU system 102 communicates with a plurality of feature extractors (first feature extractor 110A, second feature extractor 110B, third feature extractor 110C . . . $n^{th}$ feature extractor 110n) each having their own feature database (first feature database 112A, second feature database 112B, third feature database 112C . . . $n^{th}$ feature database 112n) on a plurality of different feature servers (first feature server 108A, second feature server 108B, third feature server 108C . . . $n^{th}$ feature server 108n). Any number of feature extractors 110n on different feature servers 108n may be utilized by the LU server 103 of the NLU system 102. The feature extractors 110 may process or generate the potential features in parallel. In other words, each of the feature extractors 110 may be process received NL inputs, generate potential features, and send the potential features simultaneously or at overlapping times to the LU server 103 of the NLU system 102. As such, the NLU system 102 supports multiple features extraction at once.

In some aspects, some of the different feature extractors 110 may have different specific feature specialties. In other aspects, a feature extractor 110 may have a specific feature specialty that is different from every other feature extractor. For example, the feature specialty may include a business name extractor, a location extractor, an address match extractor, a place type extractor, an airport extractor, a school name extractor, a generic entity extractor, and any other known type of feature extractor. As used herein, the generic feature extractor may refer to an auxiliary or supplemental natural language understanding system. In other words, the NLU system 102 as utilized herein may receive potential features from other NLU systems. Accordingly, the NLU system 102 as disclosed herein can incorporate any existing NLU system or newly created NLU system as an individual feature extractor into its system. As such, a generic entity extractor may include multiple feature extractors and feature databases on one feature server.

The distributed feature extractors 110 on different feature servers allows the different feature extractors 110 to be individually updated without affecting the NLU system 102 or any other feature extractors that do not require an update. For example, one or more feature extractors along with their databases may be updated without taking the NLU system 102 offline. In other words, the LU models 106 of the NLU system 102 do not need to be retrained after the one or more feature extractors 110 are updated. In previously utilized natural language understanding systems that grouped the LU model, LU decoder, and feature extractors on the same server, the NLU system 102 would have to be taken offline to update the feature extractors and their database and to retrain the LU models 106 in response to the updates to the feature extractors. As such, different features, such as business names, restaurants, different locales, etc. can be easily added or removed from one or more feature databases 112 without requiring retraining of the LU model and without requiring that the LU server 103 of the NLU system 102 be taken offline. As such, the NLU system 102 is easier to scale than previously utilized NLU systems that did not utilized distributed feature extractors. For example, additional features, domains, locales, and/or intents may be added to an existing NLU system 102 by integrating more services (or more feature extractors) instead of having to rebuild the NLU system 102. In another example, additional features, domains, locales, and intents can be added to already utilized feature extractors to update the NLU system 102 without having to rebuild the NLU system 102. In a further example, already stored features, such as domains, locales, and intents can be removed from an existing NLU system 102 by removing these features from their feature extractors without having to rebuild the NLU system 102. Additionally, because the NLU system 102 utilizes distributed feature extractors 110 on different feature servers 108, the LU server 103 has more space (memory and hard disk) to perform decoding and query or input understanding. As such the NLU system 102 processes received NL inputs faster and more efficiently than previously utilized NLU systems that did not utilized distributed feature extractors.

Each feature extractor 110 sends the determined potential features to the LU server 103 of the NLU system 102. The LU server 103 of the NLU system 102 receives the potential features from each of the feature extractors 110. The potential features may be evaluated to estimate input features for the NL input 116. The potential features may be evaluated by aggregating (or processing) the potential features and by inputting the potential features into the trained LU models 106 to estimate input features for the NL input 116. The potential features input into the LU models 106 may be the processed or aggregated potential features. In some aspects, the features are aggregated by globally re-evaluating some of the potential feature weights (or confidence scores). In some aspects, the provided feature weights may be increased or decreased. In other aspects, some features may be eliminated during the aggregation of the potential features. The aggregation of the potential features may be performed by the LU decoder 104 and/or the LU models 106. The input features include items, such as client intent, a domain, and entities. Further, the input features may include confidence scores for each determined items. A confidence score as utilized herein refers to an indicator, such as a ranking or percentage, that signifies how accurate or how confident the LU models are about the identified item.

The LU decoder 104 uses the input features and the trained LU models 106 to understand the query or, in other words, to extract semantic meaning from the input 116. The LU decoder 104 generates a response 118 to the received input based on the determined semantic meaning. As discussed above, the response 118 provides the semantic meaning of the input. For example, NLU system may generate the response of:

domain: reminder;
intent: create a reminder;
slots: reminder;
content: call mom; and
reminder time: tomorrow, for a received input of: "remind me to call mom tomorrow." The NLU system 102 sends the generated response 118 to the client device 114. In some aspects, the client device 114 provides the generated response 118 to the user of the client device 114. In other aspects, the client devices 114 utilize the received response 118 to determine how to respond to the received input 116 from the user of the client device 114.

For example, the LU server 103 of the NLU system 102 may receive a NL input of "south gate restaurant Bellevue." This input is sent to the various feature extractors 110 by the LU server 103. A "place name" feature extraction service may detect that "south gate" could be a place name and send this potential feature to the LU server 103 of the NLU system 102. A "place type" feature extraction service may detect that "restaurant" may be a "place type" and sends this potential feature to the LU server 103 of the NLU system 102. Additionally, in this example, a "location" feature extraction service could identify "bellevue" as a city name and sends this potential feature to the LU server 103 of the NLU system 102. In this example, the LU server 103 takes all these features as inputs for the LU models 106 and determines the correct or best input features for the NL input. For example, the LU models running on the LU server 103 of the NLU system 102 may determine that the domain is "place," the intent is "find places," and extract three slots: "south gate" as "place name;" "restaurant" as "place type;" and "bellevue" as "absolute location," for the received NL input. The LU decoder 104 on the LU server 103 of the NLU system 102 utilizes the items to understand the query or to determine the semantic meaning of the NL input of "south gate restaurant Bellevue." The LU decoder 104 generates a response to the input of "south gate restaurant Bellevue" based on the determined semantic meaning.

Figure 2:
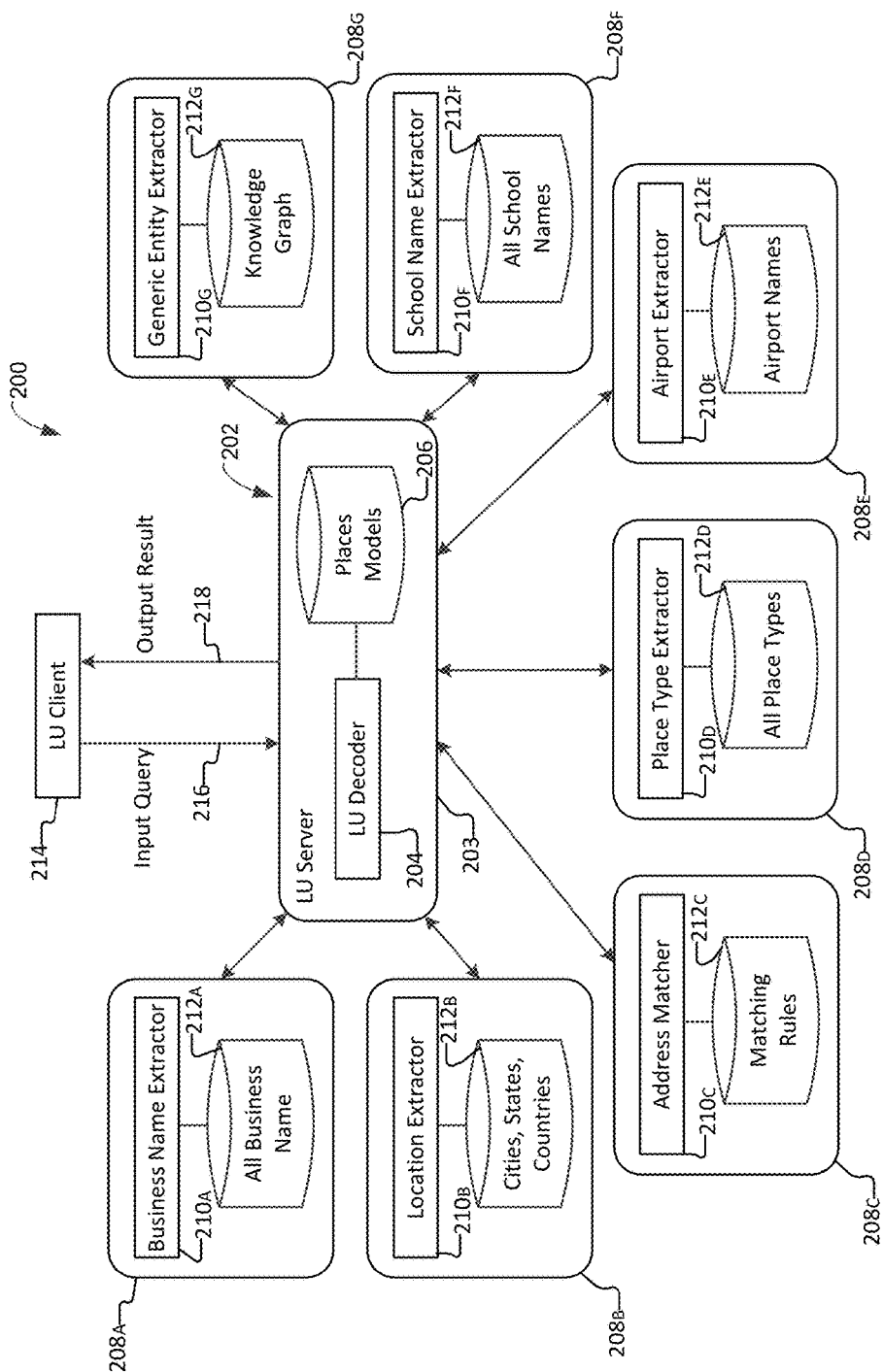
FIG. 2 is a schematic diagram illustrating an example of a distributed system including a client device, a natural language understanding system operating in a places domain, and a plurality of distributed features extractors for the places domain.

In some aspects the NLU system 102 may be applied to specific domains. For example, FIG. 2 illustrates an example of a distributed system 200 including a client device 214, a natural language understanding (NLU) system 202 operating in a places domain, and a plurality of distributed feature extractors 210 for the places domain. The NLU system 202 includes a LU decoder 204 and a places model 206 stored on a LU server 203.

In this example, the distributed feature extractors include a business name extractor 201A with a business name database 212A located on a first feature server 208A, a location extractor 210B with a location database 212B stored on a second feature server 208B, an address matcher extractor 210C with an address database 212C stored on a third feature server 208C, a place type extractor 210D utilizing a places database 212D stored on a fourth feature server 208D, an airport extractor 210E using an airport name database 212E stored on a fifth feature server 208E, a school name extractor 210F utilizing a school name database 212F stored on a sixth feature server 208F, and a generic entity extractor 210G utilizing a knowledge graph 212G stored on a seventh feature server 208G. Similar to above, training features from the feature extractors 210 are received by the LU server 103 of the NLU system 202 and utilized to train the one or more places model(s) 206. While specific feature extractors are described with respect to FIG. 2, one of skill in the art will appreciate that other feature extractors may be employed without departing from the scope of this disclosure.

Once the places model(s) 206 is trained, the NLU system 202 is ready for use by the client device 214. The client device 214 sends a natural language (NL) input 216 to the NLU system 202. The NLU system 202 sends the NL input 216 to the feature extractors 210 on the feature servers 208. In some aspects, the LU decoder 204 preprocess the input 216 before the NLU system 202 sends the input 216 to the feature extractors 210. The NL input 216 is task specific and relates to the places domain. The feature extractors 210 analyze the received input 216 utilizing their databases 212 and determine potential features for the input 216. The feature extractors 210 send the potential features to the LU server 103 of the NLU system 202.

The LU server 203 of the NLU system 202 receives the potential features and evaluates the potential features to determine input features for the NL input 216 utilizing the trained places model(s) 206. The evaluation of the potential features by the LU server 203 includes processing of the potential features. The processing of the potential features includes pruning or selecting desired potential features for input into the places model(s) 206. In some aspects the processing of the potential features is performed by the LU decoder 204 and/or LU model(s) 206. The evaluation of the potential features by the LU server 203 also includes inputting the potential features or the processed potential features into the places model(s) 206. Next, the NLU system 202 utilizing the LU decoder 204 determines or generates a response for the LU input 216 based on the determined input features. As discussed above, the response may include the semantic meaning of the LU input 216. The LU server 103 of the NLU system 202 sends the response 218 to the client device 214. The client device 214 may provide the response to the user of the client device 214 or utilized the response 218 to determine how to respond to the user of the client device 214.

Figure 3:
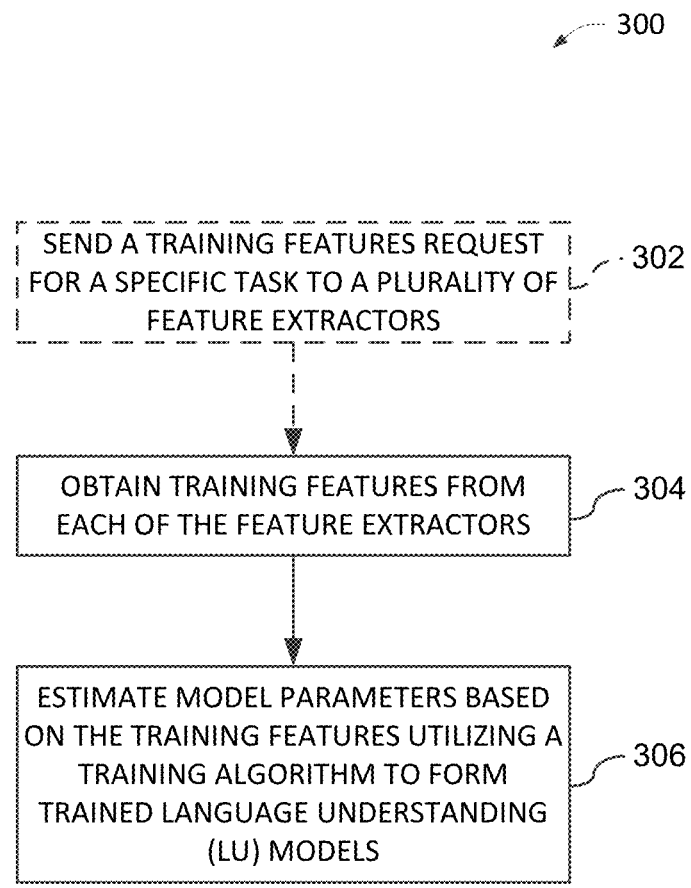
FIG. 3 is a flow diagram illustrating an example of a method for training a language understanding model of a natural language understanding system.

FIG. 3 is a flow diagram conceptually illustrating an example of a method 300 for training a language understanding (LU) model of a natural language understanding (NLU) system. In some aspects, method 300 is performed by a NLU system stored on an LU server. In further aspects, method 300 may be performed while the NLU system is not in communication with or is not connected to client device (referred to herein as offline).

Method 300 trains the LU model by utilizing features from a distributed network of feature extractors located on separate and distinct servers from the LU model. As such, method 300 provides for a more accurate NLU system, a more reliable NLU system, and a more efficient NLU system in comparison with NLU systems that utilizing feature extractors and LU models located on the same server. For example, the increased memory on the LU server (from the removal of the feature extractors) decreases the processing time for training LU models and the ability of the feature extractors to run in parallel reduces the amount of time needed to receive the training features. Further, method 300 provides better development, productivity, and scalability in comparison with NLU systems that utilizing feature extractors and LU models located on the same server. For example, because the NLU system has no memory limitations, any number of desired features extractors may be utilized to train the LU model, including generic feature extractors. Additionally, method 300 provides for a NLU system that is easier to update in comparison with NLU systems utilizing feature extractors and LU models located on the same server. For example, each feature extractor can be updated without affecting the NLU system or any other feature extractors. Further, the LU model of the NLU system does not have to be retrained after an update to a feature extractor unlike NLU systems utilizing feature extractors and LU models located on the same server.

In some aspect, method 300 includes operation 302. At operation 302, a training feature request is sent to one or more feature extractors. The feature extractors, as discussed above, are located on feature servers that may be separate and distinct from the language understanding server storing the language understanding model. Further, each feature extractor may be located a feature server that is different and separate from the other feature servers. In some aspects, the LU server of the NLU system performs operation 302. The training feature request may be for a specific task based on the type of input signal the NLU system is going to receive from the client device. The specific task may also be referred to as a "specific application" herein. In other words, the training feature request ensures that the LU models are trained with the same type of data that the LU model is going to receive in response to a NL input.

At operation 304 training features are obtained or retrieved from each of the one or more features extractors. The training features, as discussed above, may be task specific. The feature extractors pull information from their feature databases and generate training features based on the specific task. The training features may include items, such as client intent, a domain, and entities. Further, the training features may include confidence scores for each determined item.

At operation 306 model parameters are estimated based on the training features utilizing a training algorithm to form a trained LU model. Any suitable training algorithm for training a LU model as would be known by a person of skill in the art may be utilized by operation 306. For example, a support vector machine (SVM) can be used to model domain and intent detection. In further examples, a conditional random field model could be used to tag semantic slots.

Figure 4:
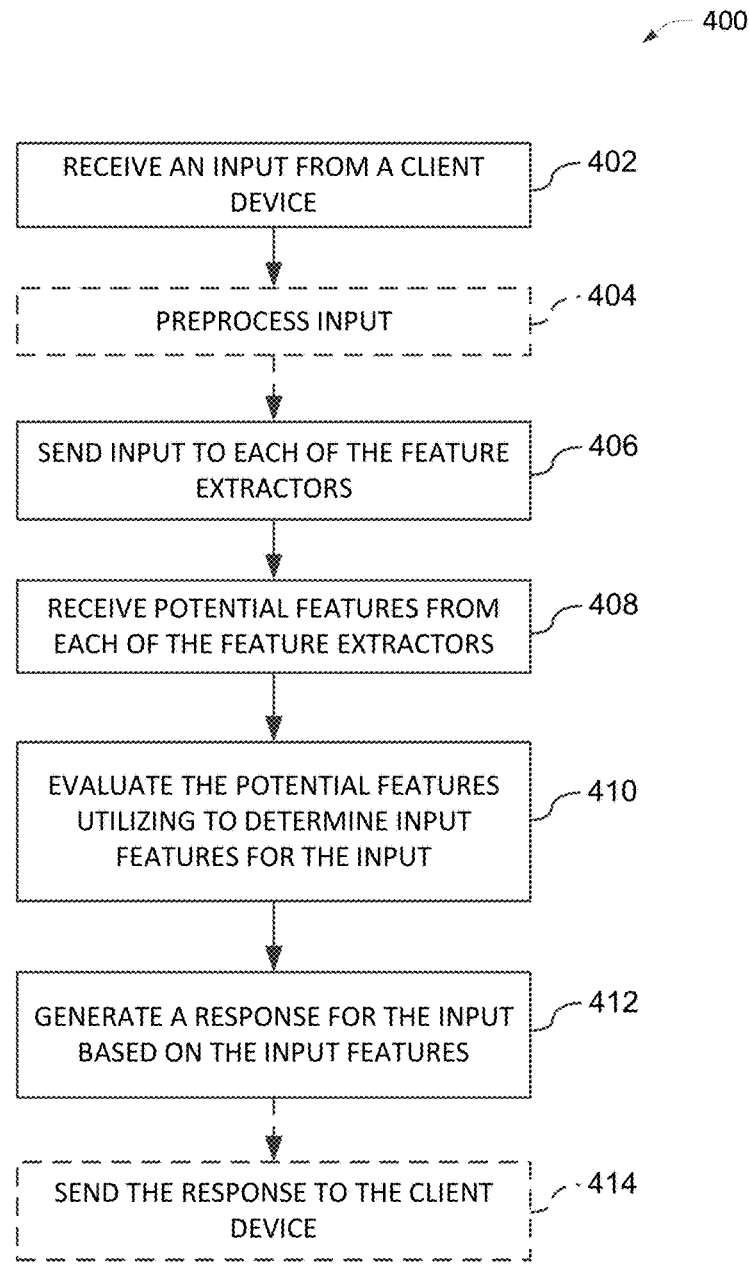
FIG. 4 is a flow diagram illustrating an example of a method for using a natural language understanding system.

Once a LU model has been trained by method 300, the NLU system including the LU model may be applied to or utilized for various tagging tasks. FIG. 4 is a flow diagram conceptually illustrating an example of a method 400 for using a natural language understanding (NLU) system. In some aspects, method 400 is performed by an LU server of the NLU system. In additional aspects, method 400 is performed when the LU server of the NLU system is online.

Method 400 utilizes potential features from a distributed network of feature extractors located on separate and distinct servers from the LU model. As such, method 400 provides for a more accurate NLU system, a more reliable NLU system, and a more efficient NLU system in comparison with NLU systems that utilizing feature extractors and LU models located on the same server. For example, the increased memory on the LU server (from the removal of the feature extractors) decreases the processing time of a received NL input and the ability of the feature extractors to run in parallel reduces the amount of time needed to receive the potential feature inputs. Further, method 400 provides better development, productivity, and scalability in comparison with NLU systems that utilizing feature extractors and LU models located on the same server. For example, because the NLU system has no memory limitations, any number of desired features extractors may be utilized to process a NL input and provide potential features for the NL input, including generic feature extractors. Additionally, method 300 provides for a NLU system that is easier to update in comparison with NLU systems utilizing feature extractors and LU models located on the same server. For example, each feature extractor can be updated without affecting the NLU system, such as taking it offline, or any other feature extractors. Further, the LU model of the NLU system does not have to be retrained after an update to a feature extractor unlike NLU systems utilizing feature extractors and LU models located on the same server.

For example, additional features, domains, locales, and intents can be added during method 400 by integrating more services (or more feature extractors) instead of having to rebuild a NLU system and without having to stop performing method 400. In another example, additional features, domains, locales, and intents can be added to already utilized feature extractors during method 400 to update the NLU system without having to rebuild the NLU system and without having to stop performing method 400. In a further example, already stored features, such as domains, locales, and intents can be removed from an existing NLU system during method 400 by removing these features from their feature extractors without having to rebuild the NLU system and without having to stop performing method 400.

Natural language (NL) input from a client device is received at operation 402. The input may be any sequence of natural language data that needs to be clustered or classified and decoded, such as queries, search queries, commands, and etc.

In some aspects, the method 400 includes operation 404. At operation 404, the input may be preprocessed. At operation 404 the input may be evaluated to determine if any preprocessing is necessary. At operation 404, if preprocessing of the input is determined to be necessary, the input is preprocessed. At operation 404, if preprocessing of the input is determined to not be necessary, the input is not preprocessed. In some aspects, operation 404 is performed by a LU decoder on the LU server.

At operation 406 the input is sent to each of the feature extractors. The input sent at operation 406 may or may not be preprocessed. Each feature extractor uses feature set definitions to extract potential features from the received NL input. In other words, each feature extractor analyzes the NL input utilizing their feature database, such as entity dictionaries, to determine potential features for the received input. In some examples, the potential features include items, such as client intent, a domain, entities, etc. Further, potential features may include confidence scores for each determined item. Any number of feature extractors on different feature servers may be utilized at operation 406. In some aspects, the feature extractors may process or generate potential features in parallel. In other words, each of the feature extractors may evaluate or process a received input to generate potential features and send the potential features to the LU server of the NLU system simultaneously or at overlapping times.

In some aspects, each feature extractor has a specific feature specialty. In other aspects, each feature extractor has a specific feature specialty that is different from every other feature extractor. In further aspects, the feature extractor may be a generic feature extractor. Accordingly, potential features from any existing NLU system or newly created NLU system can be received at operation 406.

Potential features from each of the feature extractors are received at operation 408. The LU server of the NLU system may receive the potential features during operation 408.

At operation 410 the potential features are evaluated to determine or estimate input features for the NL input. In some aspects, the input features are evaluated by aggregating (or processing) the potential features and by inputting the aggregated features into the LU models at operation 410. In some aspects, the LU models aggregate the potential features. In other aspects, the LU decoder aggregates the potential features. The input features may include items, such as client intent, a domain, and entities. Further, the input features may include confidence scores for each determined items.

A response is generated for the input based on the input features at operation 412. The response includes the semantic meaning of the input. In some aspects, the semantic meaning is determined based on the input features and/or the pre-trained LU models and/or the potential features. In some aspect, operation 412 is performed by a LU decoder on the LU server of the NLU system.

In some aspects, method 400 includes operation 414. At operation 414 the response is sent to the client device. The client device may provide the response to the user of the client device or utilize the response to determine how to respond to the received input from the user of the client device.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
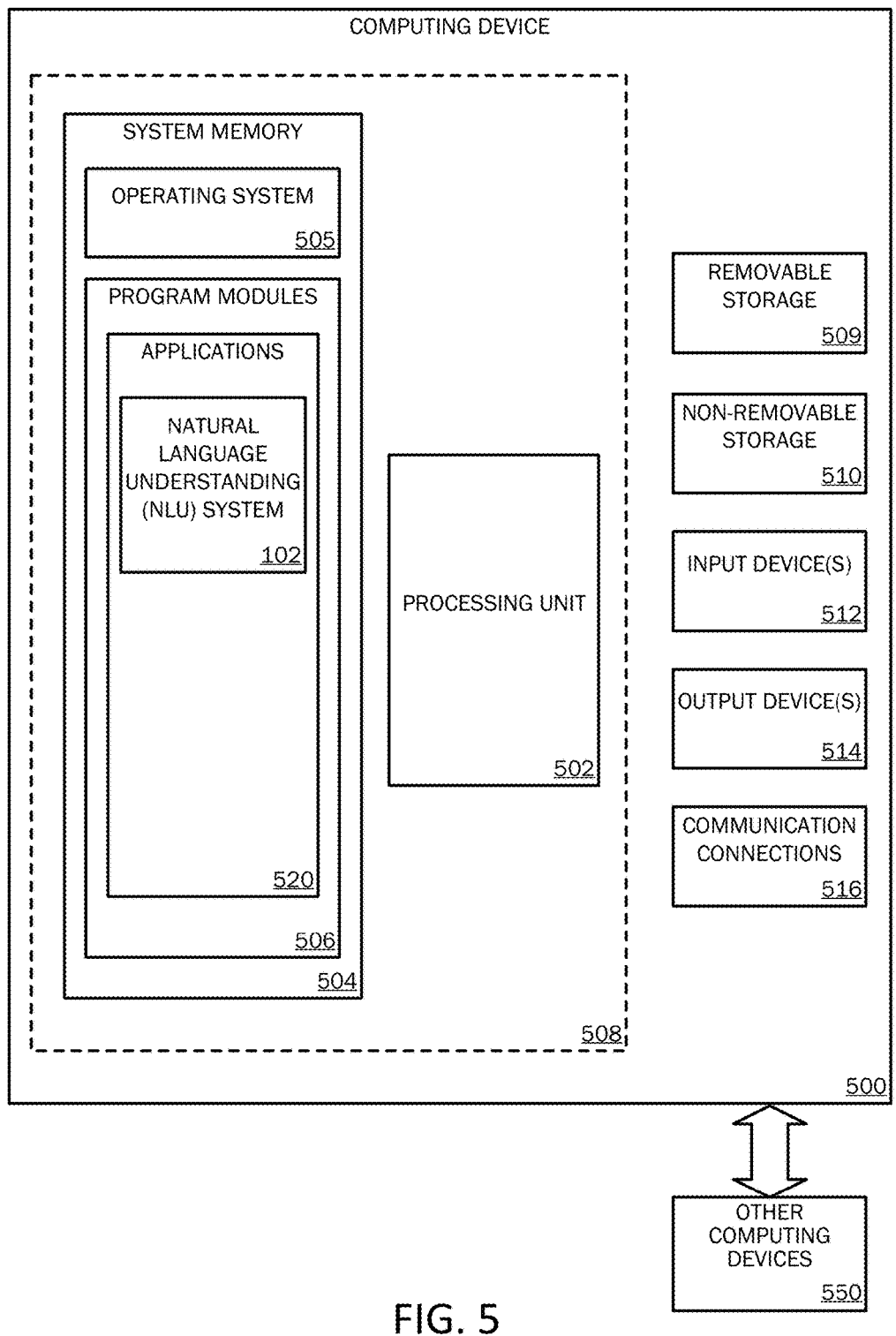
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. For example, a natural language understanding (NLU) system 102 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the NLU system that can be executed to employ the method 300 or 400 and implement portions of systems 100 or 200 disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510. For example, training features, potential features, input features and/or responses can be stored on any of the illustrated storage devices.

As stated above, a number of program modules and data files may be stored in the system memory 504. While executing on the processing unit 502, the program modules 506 (e.g., the NLU system 102) may perform processes including, but not limited to, performing method 300 and/or method 400 as described herein. For example, the processing unit 502 may implement the NLU system 102. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a calendaring application, etc. In some aspects, the NLU system 102 is performed by one of the above referenced applications.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
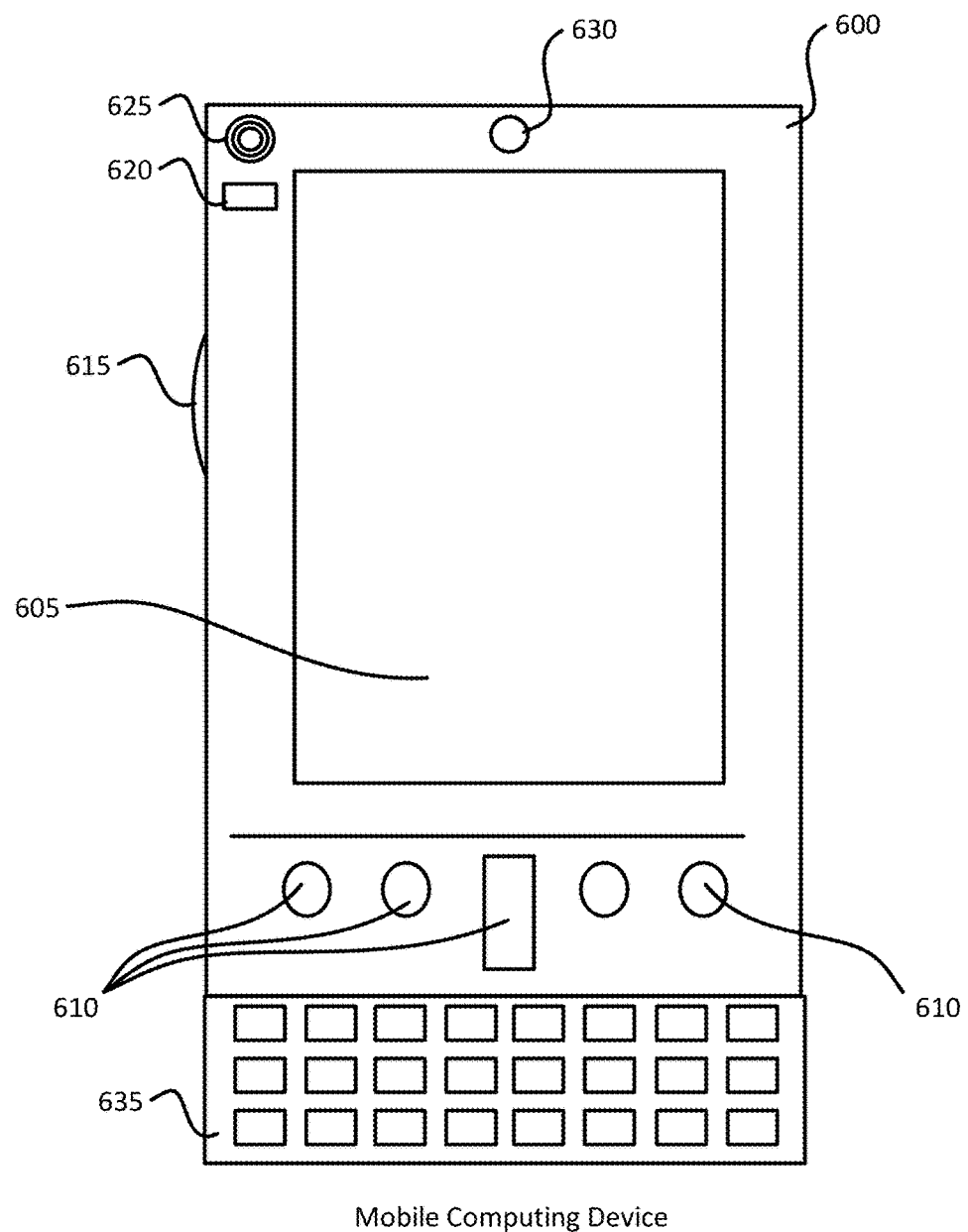
FIGS. 6A and 6B are simplified block diagrams of a mobile computing device with which aspects of the present disclosure may be practiced.
Figure 6B:
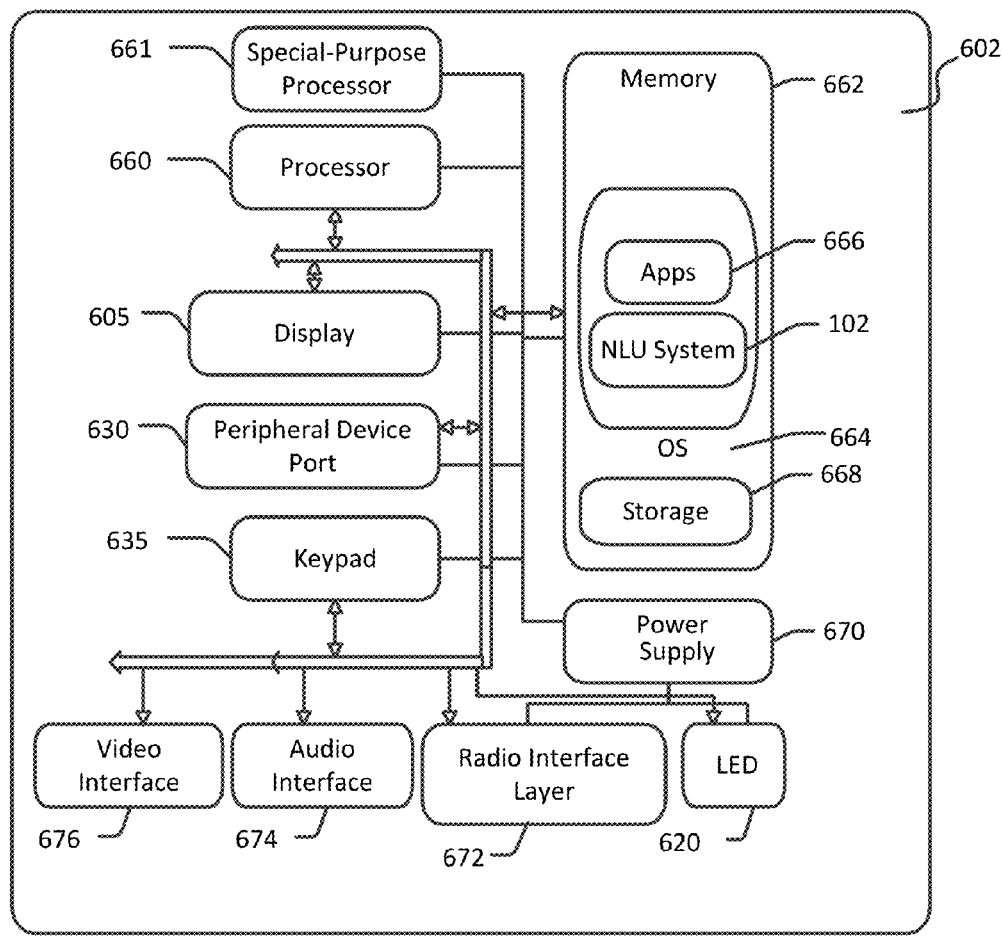

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or a NLU system 102 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
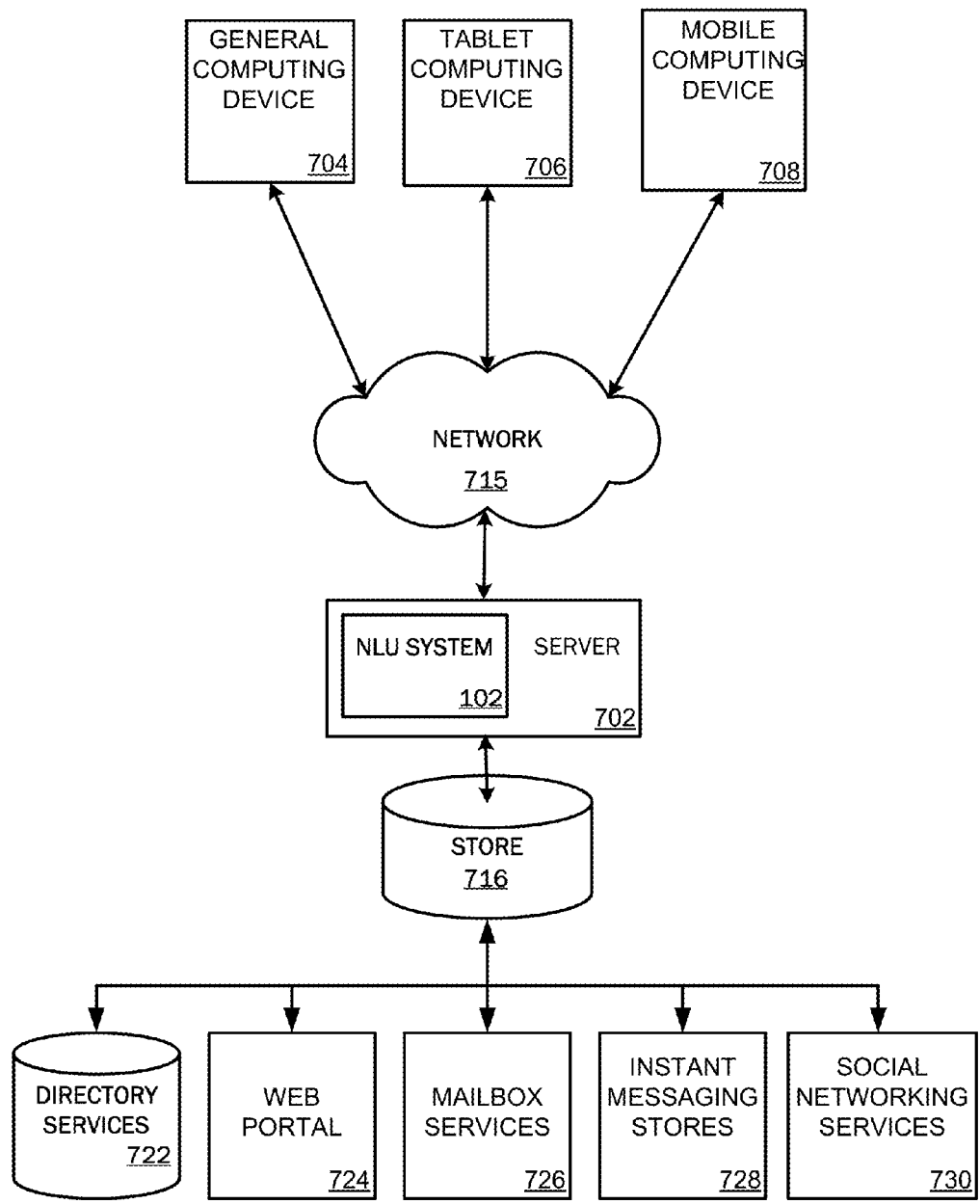
FIG. 7 is a simplified block diagram of a distributed computing system in which aspects of the present disclosure may be practiced.

FIG. 7 illustrates one aspect of the architecture of a system for processing data received at a computing system from a remote source, such as a general computing device 704, tablet 706, or mobile device 708, as described above. Content displayed at server device 702 may be stored in different communication channels or other storage types. For example, various documents may be stored using a directory service 722, a web portal 724, a mailbox service 726, an instant messaging store 728, or a social networking site 730. By way of example, a NLU system 102 may be implemented in a general computing device 704, a tablet computing device 706 and/or a mobile computing device 708 (e.g., a smart phone). In other aspects, the server 702 is configured to implement NLU system 102, via the network 715.

Figure 8:
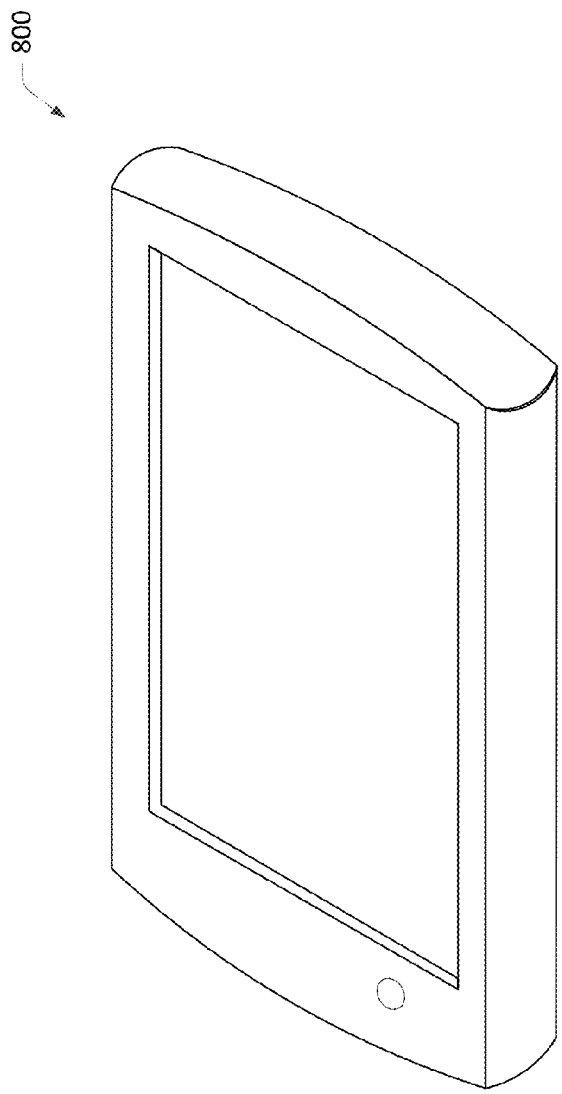
FIG. 8 illustrates a tablet computing device with which aspects of the present disclosure may be practiced.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In some aspects, a language understanding system is provided. The language understanding system comprises a language understanding server. The language understanding server includes a processor and memory. The processor executes instructions stored on the memory to perform a method. The method includes retrieving training features from a plurality of feature extractors and estimating model parameters based on a training algorithm that utilizes the training features from different feature servers to form a trained language understanding model. The plurality of feature extractors are each located on different feature servers. The language understanding server is separate from the different feature servers. In some aspects, the method further comprises receiving a natural language input from a client device and sending the natural language input to the plurality of feature extractors in response to receiving the natural language input. In additional aspects, the method also includes receiving potential features from the plurality of feature extractors after sending the natural language input to the plurality of feature extractors and receiving and evaluating the potential features to determine input features for the natural language input. In some aspects, the method also comprises determining a semantic meaning of the natural language input based on the input features and sending a response to the client device that includes the semantic meaning of the natural language input.

In other aspects a method for training and using a natural language understanding system is provided. The method comprises training a language understanding model of a language understanding system. The training of the language understanding model comprises receiving, at a language understanding server, training features from a plurality of feature extractors and estimating model parameters based on a training algorithm that utilizes the training features from the different feature servers to form a trained language understanding model. The plurality of feature extractors are each located on different feature servers. The language understanding server is separate from the different feature servers.

In further aspects, a system is provided. The system comprises at least one processor and a memory. The memory includes computer-executable instructions stored thereon. The computer-executable instructions are executed by the at least one processor. The computer-executable instructions cause the system to perform operations including receiving a natural language input from a client device on a natural language server, sending the natural language input to a first feature extractor on a first server from the natural language server, sending the natural language input to a second feature extractor on a second server from the natural language server, and sending the natural language input to a third feature extractor on a third server from the natural language server. The first server, the second server, the third server, and the natural language server are different and separate from each other. The computer-executable instructions further cause the system to perform operations, the operations comprising receiving a first set of potential features for the natural language input from the first feature extractor by the natural language server, receiving a second set of potential features for the natural language input from the second feature extractor by the natural language server, and receiving a third set of potential features for the natural language input from the third feature extractor by the natural language server. The computer-executable instructions additionally cause the system to perform operations, the operations comprising aggregating the first set of potential features, the second set of potential features, and the third set of potential features to form an aggregated set of potential features, evaluating the aggregated set of potential features utilizing a language understanding model trained with training features from the first feature extractor, the second feature extractor, and the third feature extractor, determining a user intent, a domain, and entities and associated confidence scores based on evaluating the aggregated set of potential features, and generating a response based on the user intent, the domain, and the entities and the associated confidence scores.

The system of claim 19, wherein the first feature extractor is an auxiliary language understanding system, the second feature extractor is a location extractor, and the third feature extractor is place type extractor.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some aspects of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A language understanding system, the language understanding system comprising:
    a language understanding server, the language understanding server comprises:
    at least one processor; and
    memory encoding computer executable instructions that, when executed by the at least one processor, perform a method comprising:
        retrieving training features from a plurality of feature extractors, wherein the plurality of feature extractors are each located on different feature servers, and wherein the language understanding server is separate from the different feature servers; and
        estimating model parameters based on a training algorithm that utilizes the training features from the different feature servers to form a trained language understanding model;
        receiving a natural language input from a client device;
        sending the natural language input to the plurality of feature extractors in response to receiving the natural language input;
        receiving potential features from the plurality of feature extractors after sending the natural language input to the plurality of feature extractors;
        receiving and evaluating the potential features to determine input features for the natural language input;
        determining a semantic meaning of the natural language input based on the input features; and
        sending a response to the client device that includes the semantic meaning of the natural language input.

2. The language understanding system of claim 1, wherein at least one feature extractor of the plurality of feature extractors is an auxiliary natural language understanding system.

3. The language understanding system of claim 1, wherein the input features include domains, intents, and entities.

4. The language understanding system claim 3, wherein the input features further include a confidence score for each of the domains, the intents, and the entities.

5. The language understanding system of claim 1, wherein the plurality of feature extractors run in parallel.

6. The language understanding system of claim 1, wherein each feature extractor of the plurality of feature extractors has a different feature specialty.

7. The language understanding system of claim 1, wherein the trained language understanding model is trained for a specific application, wherein the specific application is at least one of:
    a digital assistant application;
    a voice recognition application;
    an email application;
    a social networking application;

a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
an exchange application; and
a calendaring application.

8. A method for training and using a natural language understanding system, the method comprising:
training a language understanding model of a language understanding system, the training comprises:
receiving, at a language understanding server, training features from a plurality of feature extractors, wherein the plurality of feature extractors are each located on different feature servers,
wherein the language understanding server is separate from the different feature servers;
estimating model parameters based on a training algorithm that utilizes the training features from the different feature servers to form a trained language understanding model;
receiving a natural language input from a client device;
sending the natural language input to the plurality of feature extractors;
receiving potential features for the natural language input from the plurality of feature extractors;
evaluating the potential features utilizing the trained language understanding model to determine input features for the natural language input; and
generating a response to the natural language input based on the input features.

9. The method of claim 8, wherein at least one of the plurality of feature extractors is an auxiliary natural language understanding system.

10. The method of claim 8, wherein the input features comprise domains, intents, and entities and their associated confidence scores.

11. The method of claim 8, wherein each of the plurality of feature extractors run in parallel.

12. The method of claim 8, wherein each feature extractor of the plurality of feature extractors has a different feature specialty.

13. The method of claim 8, wherein the natural language input is preprocessed with a language understanding decoder on the language understanding server, and
wherein the natural language input sent to the plurality of feature extractors is preprocessed.

14. The method of claim 8, further comprising:
sending the response to the client device,
wherein the response includes a semantic meaning of the natural language input, and
wherein the client device is at least one of:
a mobile telephone;
a smart phone;
a tablet;
a smart watch;
a wearable computer;
a personal computer;
a desktop computer;
a gaming system; and
a laptop computer.

15. The method of claim 8, wherein new features are added to at least one feature extractor of the plurality of feature extractors, and
wherein the language understanding model does not need to be re-trained in response to the addition of the new features.

16. The method of claim 8, wherein the language understanding model is trained for a specific application, wherein the specific application is at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
an exchange application; and
a calendaring application.

17. A system comprising:
at least one processor; and
a memory encoding computer executable instructions that, when executed by the at least one processor, cause the at least one processor to perform a method for language understanding, the method comprising:
receiving a natural language input from a client device on a natural language server,
sending the natural language input to a first feature extractor on a first server from the natural language server;
sending the natural language input to a second feature extractor on a second server from the natural language server,
sending the natural language input to a third feature extractor on a third server from the natural language server,
wherein the first server, the second server, the third server, and the natural language server are different and separate from each other;
receiving a first set of potential features for the natural language input from the first feature extractor by the natural language server;
receiving a second set of potential features for the natural language input from the second feature extractor by the natural language server;
receiving a third set of potential features for the natural language input from the third feature extractor by the natural language server;
aggregating the first set of potential features, the second set of potential features, and the third set of potential features to form an aggregated set of potential features;
evaluating the aggregated set of potential features utilizing a language understanding model trained with training features from the first feature extractor, the second feature extractor, and the third feature extractor;

determining a user intent, a domain, and entities and associated confidence scores based on evaluating the aggregated set of potential features; and generating a response based on the user intent, the domain, and the entities and the associated confidence scores.

18. The system of claim 17, wherein the first feature extractor is an auxiliary language understanding system, the second feature extractor is a location extractor, and the third feature extractor is place type extractor.

* * * * *